March 26, 1963  C. BUDDINGH ET AL  3,082,829

ROTARY WEEDER

Filed Oct. 24, 1960  5 Sheets-Sheet 1

INVENTORS
CORNELIUS BUDDINGH
MARINUS BUDDINGH
BY
Price and Heneveld
ATTORNEYS

INVENTORS
CORNELIUS BUDDINGH
MARINUS BUDDINGH
BY Price and Heneveld
ATTORNEYS

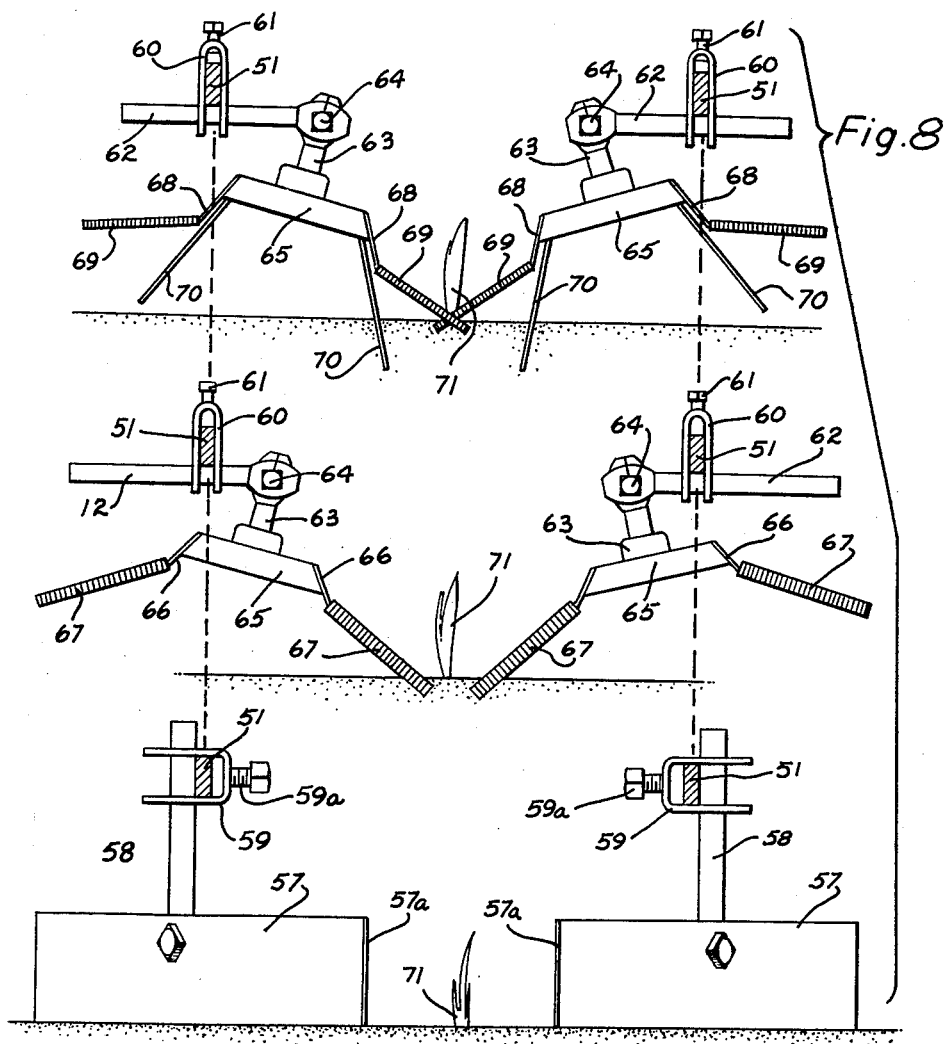
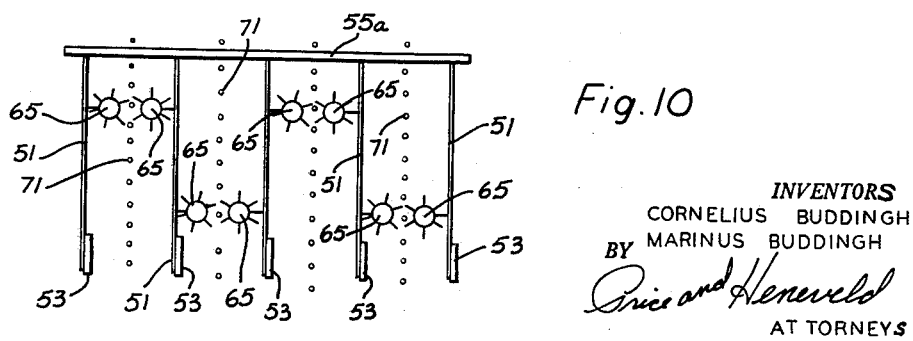

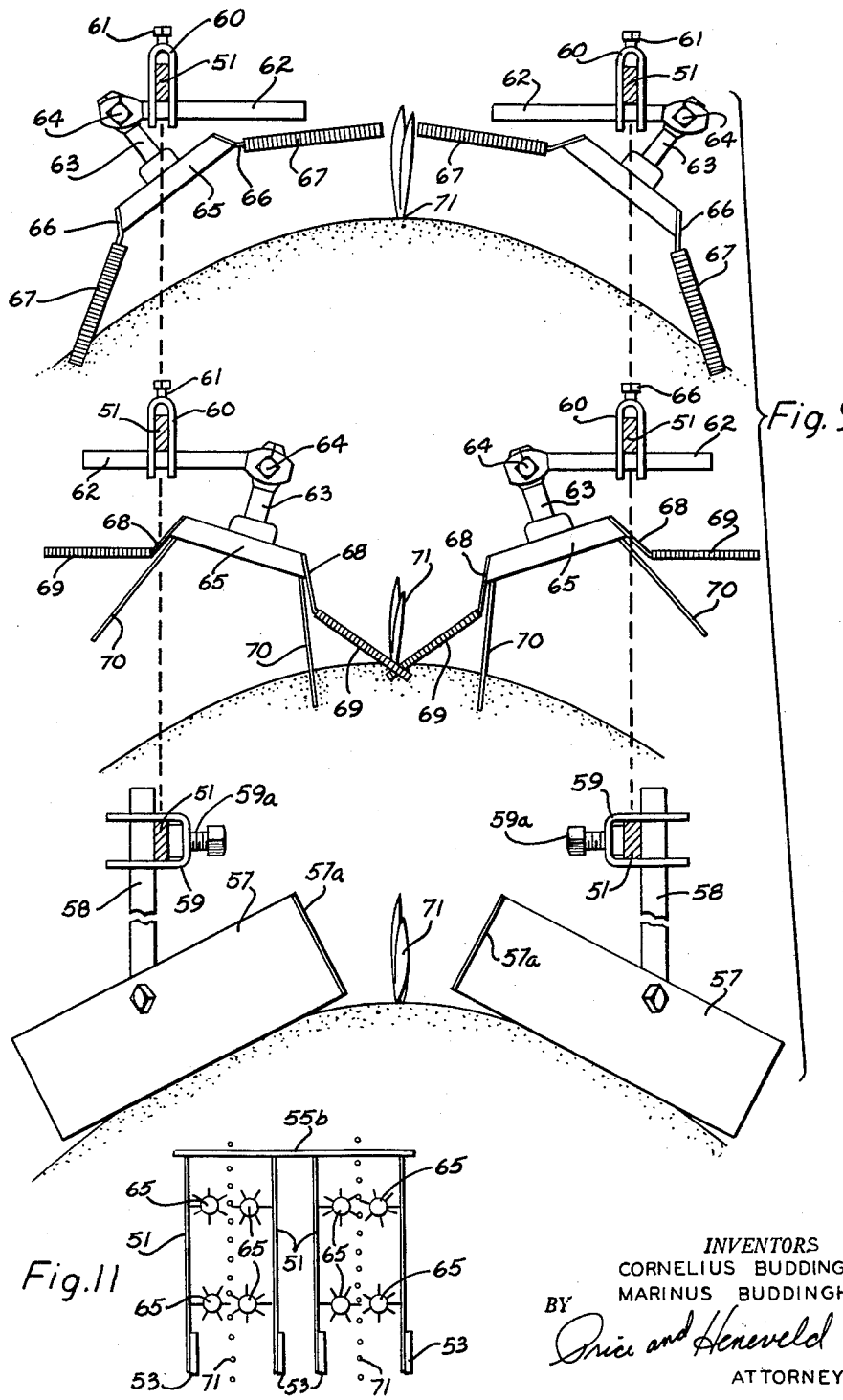

United States Patent Office 3,082,829
Patented Mar. 26, 1963

3,082,829
ROTARY WEEDER
Cornelius Buddingh and Marinus Buddingh,
Caledonia, Mich.
Filed Oct. 24, 1960, Ser. No. 64,481
2 Claims. (Cl. 172—184)

This invention relates to a rotary weeder. More particularly, this invention relates to an apparatus which removes weeds from within a crop row as well as those weeds adjacent thereto. This application is a continuation-in-part of our copending United States patent applications Serial Nos. 590,737 and 754,950, both now abandoned, in that it better describes and claims certain features shown therein with no new matter being added.

The problems of protecting young plants from fast growing weeds and grass consumes a very large part of a farmer's time as the plants begin growing. Because it is so important to remove these nuisances from the ground constantly in order that the growing crops may survive, farmers often employ many people to hoe the weeds out of the crop row itself. Many types of weeders already in existence perform the task of removing weeds from between the rows quite well. However, no device prior to this time has been able to successfully remove the weeds from the crop row itself. The only way these weeds have been satisfactorily removed in the past has been to use a hand hoe in the row. This is very time consuming, tiring, and very expensive in cases where extra help must be hired during this special time. This is especially true of nursery plants, young strawberry plants, bean plants, and of all those plants commonly referred to as truck farming crops. More than half the worry and struggle in raising such crops is over if at the end of the first few weeks they have had a relatively weed-free environment.

For other crops such as corn, a device has never been produced which satisfactorily removes weeds from the rows. Consequently, the common practice is to plant corn in hills, and then cultivate first in one direction between the rows and then cultivate between the rows from a direction at right angles to the first cultivation. In this manner many of the weeds are eliminated, although weeds retain a free rein immediately adjacent the hill itself.

It is, therefore, an object of this invention to provide a weeding apparatus which removes weeds and grass from within the crop row itself.

Another object of this invention is to provide such weeding apparatus which for the most part eliminates the necessity of hoeing a crop row.

Another object of this invention is to provide such apparatus which achieves these results without damaging the plants in the row.

Still another object of this invention is to provide such apparatus which is simple to operate, and economical to fabricate and maintain.

A still further object of this invention is to provide an apparatus which both loosens, breaks and mulches the earth for a short distance below the surface and at each side of the crop row, and sweeps the surface portion of the ground at the crop row.

Other objects of this invention will become obvious to those skilled in the art of cultivating equipment upon reading the following specification in conjunction with the accompanying drawings, wherein:

FIG. 8 shows in transverse section one after the other, the ground leveling, mulching and sweeping elements of the weeder of FIG. 6 in their relative locations to each other as they are moved lengthwise of a row of plants, the ground being substantially level;

FIG. 9 is a view similar to FIG. 8, showing such elements differently arranged and adjusted for weeding plants in rows and maintaining the same covered at their lower portion by the earth to prevent sun exposure, frequently used in conjunction with celery, for example, and FIGS. 10 and 11 are diagrammatic plan views showing other ways of arranging the mulching and surface sweeping mechanisms in conjunction with a plurality of the rows of plants.

Briefly, this invention relates to the particular manner in which the rotary weeder described and shown herein is mounted on the moving frame. The rotary head is rigidly and rotatably mounted on the frame for rotation about an axis which is forwardly and outwardly inclined in a downwardly direction with respect to the row from which weeds are to be removed. A plurality of rods are mounted in the head, extending downwardly from the head, the lower ends thereof tracing a generally circular path and alternately engaging the ground for rotation of the head. A plurality of flexible, resilient members are also mounted on the head, extending downwardly, their lower ends tracing a generally curvilinear path lying outside of the path traced by the lower ends of the rods. The inclination of the head causes each member to sweep downwardly and engage the ground essentially along the crop row and just as it starts moving away from the crop row. As a result the resilient members rarely, if ever, engage or gouge the roots since while they are crossing the row they are above ground.

In a more limited aspect of this invention, a pair of rotary mulchers work in combination with sweeping weeders, to be more fully described hereinafter.

Figure 1:
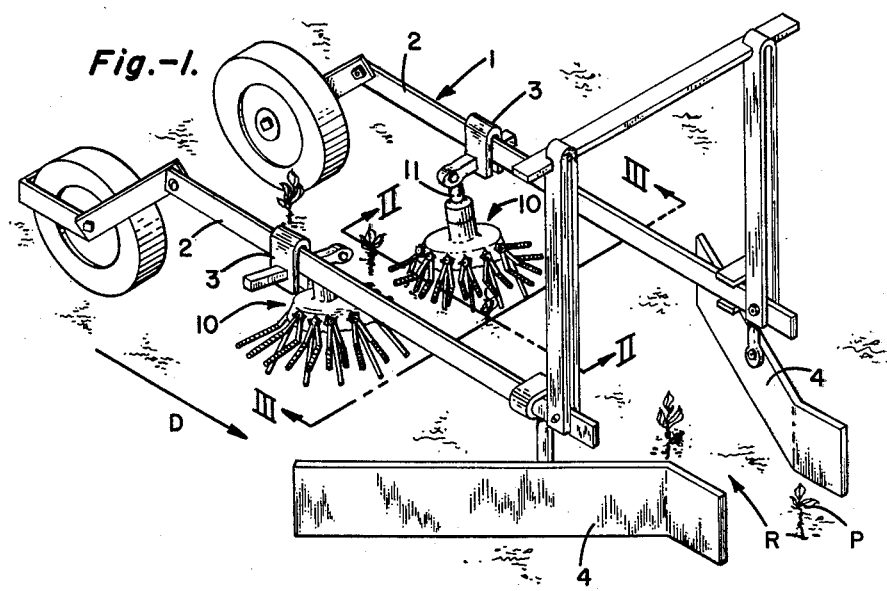
FIG. 1 is a top, perspective view of a frame, having a pair of rotary weeders mounted thereon according to this invention.

Referring now to the drawings, the reference numeral 1 (FIG. 1) designates a frame for movably supporting the rotary weeders 10 from the ground. Frame 1 includes beams 2, from which the weeders 10 are rigidly and rotatably suspended with shafts 11 mounted in metal strap and cross bar assemblies 3. Conventional scraping shields 4 suspended from frame 1 straddle the row R of plants P as the frame moves along the ground as indicated by the arrow D. All of this structure other than weeders 10 is old and well known to the cultivating art, and is not important to this invention other than to show an environment in which our weeders 10 are mounted with their particular inclination which comprises an aspect of this invention. Other frame structures could be effectively utilized.

Figure 2:
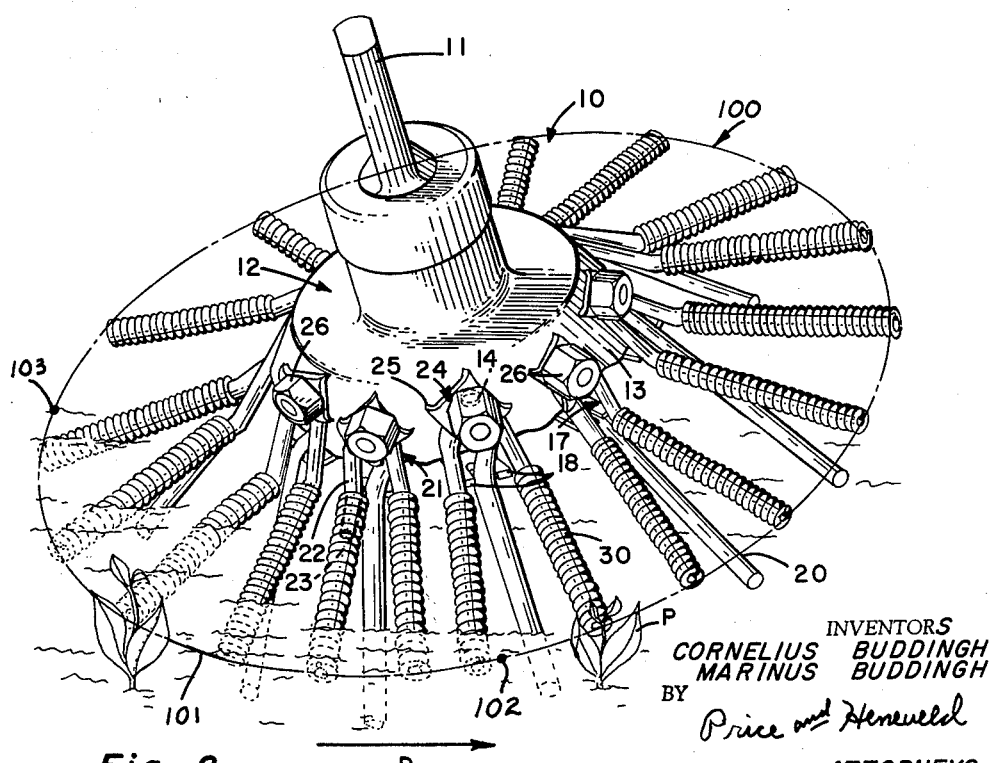
FIG. 2 is a side view taken along the plane II—II of FIG. 1.

The weeders 10 are rotatably mounted on the shaft 11 having their axis inclined to the vertical (FIG. 2). This inclination will be fully described hereinafter. Each weeder 10 includes a frusto-conical head 12 having a generally circular flange 13 depending downwardly and outwardly thereof. In flange 13 are a plurality of approximately equally spaced holes 14. Bolts 15 extend through holes 14, with their shanks 16 extending outwardly of flange 13.

Secured on each bolt 15 inwardly of flange 13 is a small elongated retainer plate 17 having two spaced ears 18 extending outwardly of the retainer plate extending below flange 13. Eye 19 of rod 20 fits on shank 16, rod 20 fitting between ears 18, thus preventing rotative movement of rod 20, and depending downwardly and outwardly of head 12 for engaging the ground and rotating the weeder. Inverted U-shaped members 21 fit over shanks 16 of bolts 15 outwardly of flange 13 and are held against rotative movement by ears 18 and a square washer 24 having inwardly bent corners 25. Nut 26 rigidly holds all of these parts on the bolt 15.

The lower portions 23 of the legs 22 of inverted U-shaped members 21 extend outwardly from flange 13 at a greater angle than the main portions of legs 22. Mounted on the lower end portions 23 are flexible, resilient, yieldingly resistant members 30, shown in the drawings as wire coil springs. The lower ends of these members trace a generally curvilinear path outside of the generally circular path traced by the lower ends of rods 20. These members 30 are adapted to sweep through and stir the ground as the weeders 10 rotate, in a manner to be more fully described hereinafter.

Figure 3:
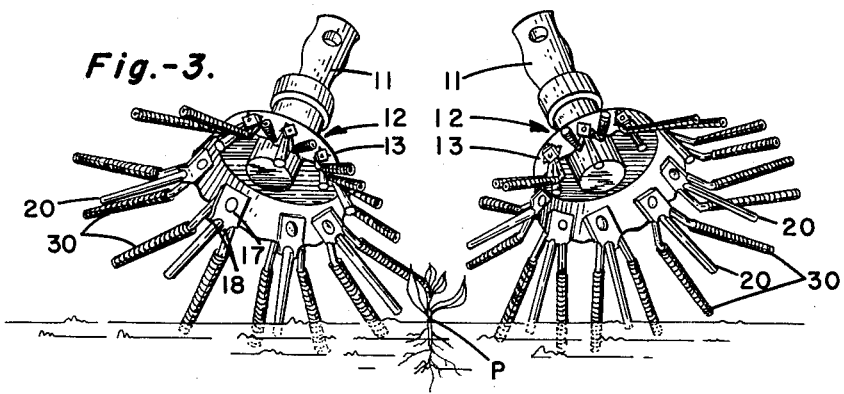
FIG. 3 is a front view taken along the plane III—III of FIG. 1.

The particular inclination of these weeders to the ground is very important. An examination of FIGS. 2 and 3 best show this inclination. First of all the weeders 10 are inclined forwardly in a downward direction with respect to the direction of movement as best shown in FIG. 2. These weeders are also inclined outwardly in a downward direction with respect to the crop row from which weeds and grass are to be removed as best shown in FIG. 3. This inclination, both forwardly and outwardly in a downward direction, in combination with the structure herein described, functions to produce the new, unobvious and much desired result of removing the weeds from the crop row itself without damaging the plants.

The particular height of the weeders 10 is also important. The weeders 10, inclined as hereinbefore described, are secured to frame 1 such that the members 30 engage the ground at a point proximate to the crop row-line, and they begin penetration of the ground as they move away from this line. This height, combined with proper inclination, causes members 30 to create an action in the soil much like that obtained when one sweeps his hand through water. A "dragging" effect is achieved, pulling small weeds and the like from the crop row, without damaging the plants themselves. It will be noted that in accordance with this construction the free ends of the members 30 are arranged on a curvilinear locus line 100 which is tipped downwardly toward the crop row and rearwardly of the movement of frame 2. These locus lines intersect the ground so as to have an arc 101 below the surface of the ground defined by a chord portion, this arc and its associated chord portions extending from a point 102 proximate the crop row line to a point 103 rearwardly of the direction of movement of the frame.

*Operation*

Figure 4:
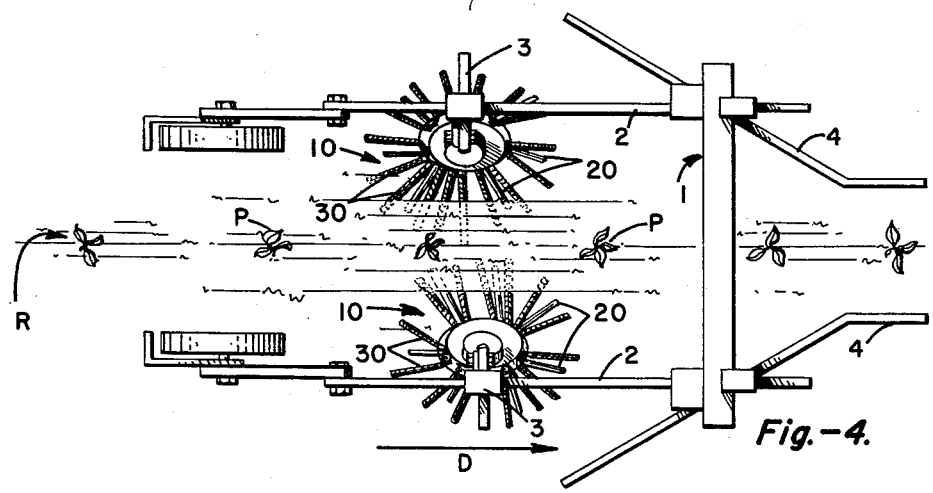
FIG. 4 is a top plan view of the frame and weeders shown in FIG. 1.
Figure 5:
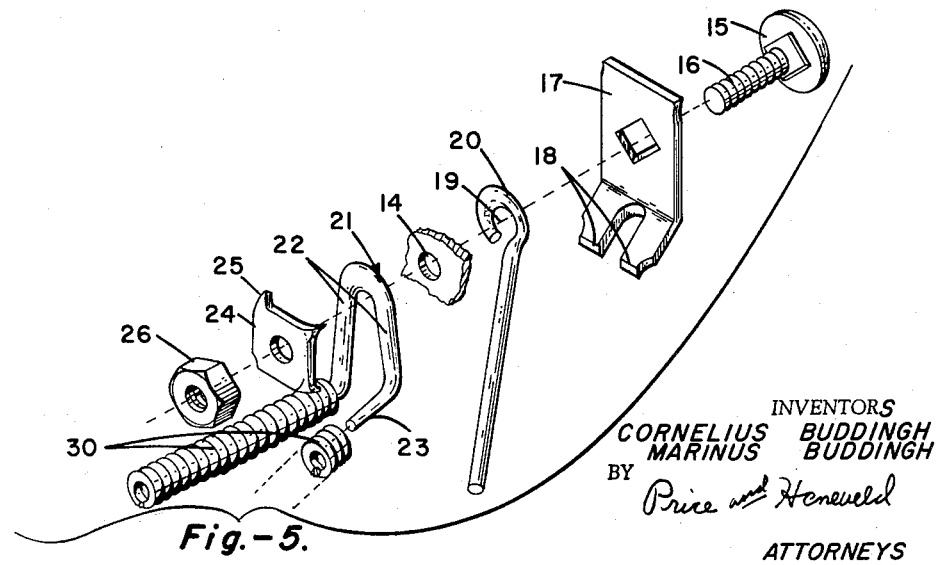
FIG. 5 is a fragmentary sectional view of one of the attachment means for the driving rod and spring.
Figure 6:
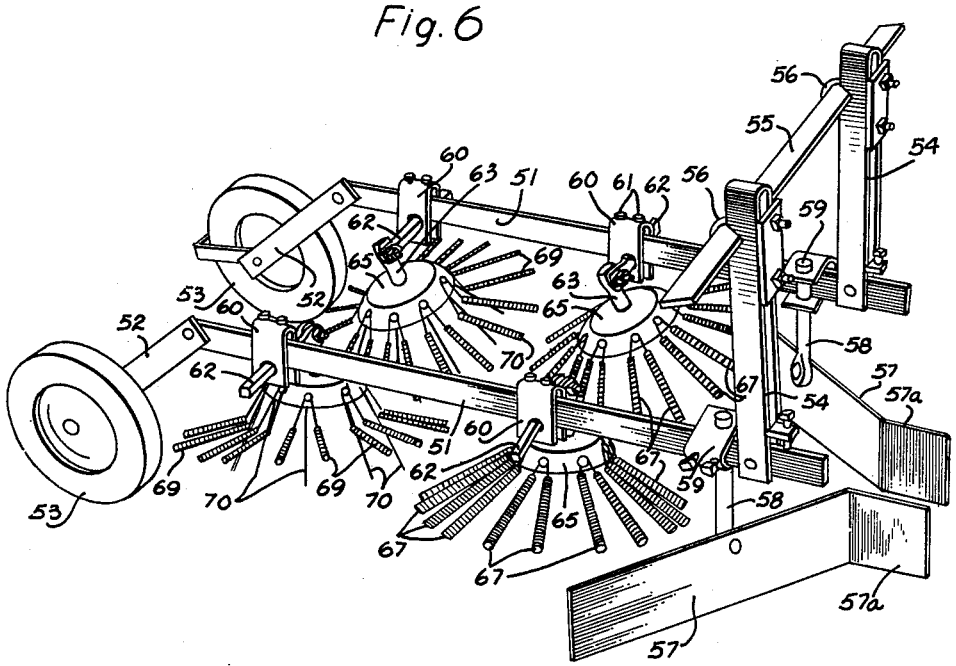
FIG. 6 is a perspective view of another embodiment of the weeder of our invention.

After the weeders 10 have been mounted on the frame 1 with an inclination to the ground as described hereinbefore, the weeding apparatus operates as follows. As the frame moves along the ground in the direction indicated by the arrow D, the rods 20 will successively engage the ground and thereby rotate the weeders 10. It will be obvious that as weeders 10 rotate about the shafts 11, the coil springs 30 will also rotate. Because of the height and fixed inclination of the weeders 10, it will be noted in FIGS. 2, 3 and 4 that the ends of springs 30 do not engage the ground until the point in their rotational arc where they will begin moving away from the crop row. The inclination of weeders 10 being forwardly and outwardly in a downward direction causes these ends to sweep downwardly towards the crop row and engage the ground approximately at the point identified by the reference numeral 102 when the springs 30 are approximately normal to the crop row and just as they start moving away from the row. As these ends successively engage the ground, further rotation of weeders 10 causes them to dig in and penetrate more deeply into the soil as they move away from the crop row. These ends remain in the soil during the entire period of time that they move away from the row, shown by the arc 101 of the curvilinear locus line 100. Because the members 30 are flexible, resilient, yieldingly resistant coil springs, they twist and turn in a snake-like fashion as they are swept through the soil.

This action within the soil proximate to the row line stirs the soil adjacent thereto and uproots small weeds from within the crop row but does not affect the plants. As the weeds are uprooted in this manner, the action of spring 30 throws them from the row and dirt is worked in such a manner that they are left exposed to the sun and other elements of nature which very quickly kill them and prevent re-rooting and continued growth.

Because these springs begin their working action proximate the plant row and only as they move away from the plant row, the plants themselves are left undamaged as they are stronger and more hardy than the small weeds particularly because of their size.

It has been found that when such weeding apparatus is utilized for cultivation, the need for manual hoeing is practically eliminated. Some spot manual hoeing may be carried out to catch an occasional weed which somehow grew to be of equal strength to the plants themselves before the weeding operation. However, substantially all of the weeds and grass are pulled from the row as the ends of the springs sweep down to engage the ground within the row and work in the ground as they move away from the row. Of course, the weeds between the crop rows are also removed by these weeders.

This invention discloses a weeding apparatus which is easy to operate, and inexpensive to fabricate and maintain. This weeding apparatus not only removes weeds and grass from between the crop rows, but also pulls and drags them from within the crop row itself. This is accomplished without damage to the plants in the row. Because of this, the necessity for manually hoeing weeds from the crop row is substantially eliminated. These results are obtained by the particular inclination in combination with structure described hereinbefore.

*Structure of FIGS. 6–11*

In FIGS 6–11, a structure is shown utilizing a pair of mulchers in front of rotary weeders, the inclination of the weeders being the same as that described hereinbefore. In the preferred embodiment of this particular structure, two spaced parallel bars 51 have each at its rear end a downwardly extending bar 52, at the lower end portion of which is a wheel 53 to run on the ground. Near the front end of each of the bars 51, a vertical post 54, in structure shown as of an inverted U-form, is connected at its lower end to its associated bar 51. Such posts 54 are notched near their upper ends at their rear portions and a horizontal drawbar 55 is seated therein and adjustably secured in place by U-bolts 56 embracing the bar 55 and extending through the posts 54 with nuts at the front ends of the U-bolts against plates which press against the front sides of the posts 54. Such bar 55 is the bar by means of which connection is made to a tractor and its elevation controlled by a tractor lift of old and well known structure to adjust the distance that the front end portions of the bars 51 are above the ground.

At the front end of the frame structure thus described, scrapers 57 diverging rearwardly from each other and having parallel spaced front ends 57a are pivotally carried at the lower ends of vertical rods 58 which are releasably and adjustably clamped to the bars 51 by generally U-shaped clips 59 through the legs of which rod 58 passes, set screws 59a tightening the rods 58 against the bars to provide a secure connection. The lower ends of the rods 58 are pivotally connected to the scrapers 57 by bolts as shown in FIGS. 8 and 9, tightening the nuts of which will hold the scrapers in any angular position to which adjusted. The front end portions 57a of the scrapers when used with a row of plants will be located with one at each side of a row and in practice approximately 4" apart, that is, approximately 2" to each side of the row when used as shown in FIG. 8. The ground being substantially level, it will be smoothed off between adjacent rows and within approximately 2" of the rows at each side.

On each of the bars 51 also back of each scraper is a rotatable mulching unit or "cone." It is adjustably secured to its associated bar by an inverted U-shaped fixture 60 through the upper side of which adjusting and clamping screws 61 pass to bear against the upper edge of the associated bar. The depending legs have horizontally aligned openings. A bar 62 square in cross section passes horizontally through said openings and is snugly tightened against the lower edge of the bar 51 with which associated by turning the screws 61 downwardly.

The mulching cones, one attached at the inner end of each bar in FIG. 8, each include a short stem 63, the upper end of which is located alongside the end of the bar 62 to which attached. The two associated ends of the stems 63 and bar 62 are flattened and lie against each other and are clamped in any position to which the stem 63 may be adjusted with respect to the horizontal bar 62 by a bolt 64 passing therethrough.

At the lower end of the stem 63 is a rotatably mounted frusto-conical member 65. Around it a plurality of U-shaped rods 66 are secured by bolts or other equivalent fastenings, the free ends of said rods diverging outwardly and downwardly from the axis of the cone. On each of the rods 66 a flexible, preferably, metallic ground breaking or mulching member 67 in the form of an elongated tightly coiled generally spring-like member is fastened by threading said members 67 on their associated rods 66 in a manner such that the coils tightly grip the rods. The free end portions of the members 67 extend beyond the ends of the rods 66 so that they are readily bent and flexed to one side or the other and will return to axially align with the rods to which attached when free to do so.

Back of the ground breaking or mulching cone and spaced therefrom on each bar is a weeder cone. It has the same structure of two attaching fixtures 60, set screws 61, bars 62, stems 63 and frusto-cones 65. In addition, U-shaped members providing rods 68 are connected in spaced relation around the outer side of the cone member 65, the same as the rods 66 on the front cones. Such rods 68 may be of a smaller diameter than the rods 66 and the closely coiled spring-like members 69 secured to the rods 68 in the same manner as the members 67 to the rods 66, are of lesser strength, more flexible and easier strained from normal positions than the members 67.

Figure 7:
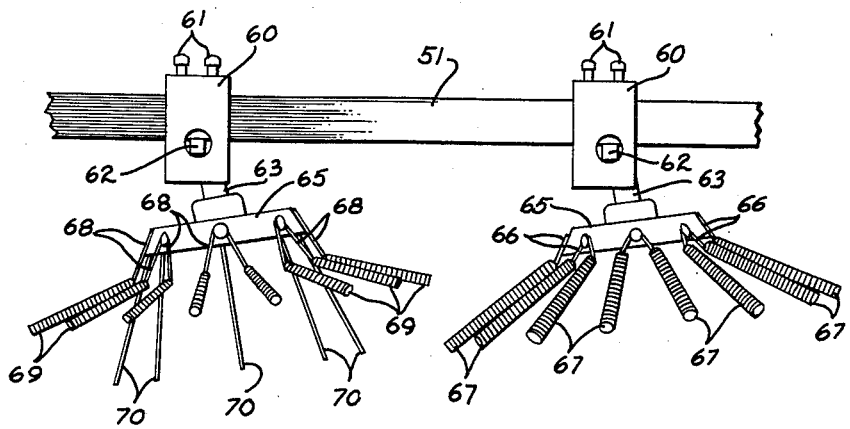
FIG. 7 is a fragmentary somewhat enlarged side elevation of the weeder of FIG. 6 showing the mulching and weed sweeping elements thereof, one back of the other.

In addition to such members 68, 69 a plurality of downwardly diverging rods 70 are connected to the cone member 65 of the weeder cone, one for each pair of the rods 68 and between them which, as shown in FIG. 7, while diverging outwardly do not have as wide divergence downwardly and outwardly from the vertical as the yielding member 67.

In practice, in normal weeding on generally flat ground, as in FIG. 8, the structure thus described is pulled lengthwise of a row of plants 71. In the lower sectional view in FIG. 8 the front ends 57a of the scrapers 57 are a short distance to each side of the plant row, leveling the ground outside of such short distances. The ground breaking and mulching cones in the intermediate portion of FIG. 8 are tilted so that the axes of rotation of the stems 53 about which they turn are at a desired angle to the horizontal such that the outer ends of the members 67 reach and penetrate the ground in succession at each side of the plants of the plant row 71. Such penetrating ends preferably will be set approximately 2" apart in general usage. The following weeding cones will have the bars 62 adjusted and the cones 65 tilted as shown in the upper portion of FIG. 8 so that the free end portions of the member 69 as they tilt downwardly near the row of plants, overlap and penetrate the ground approximately one-half inch.

It is evident that as the weeder is moved lengthwise of a row of plants 71, drawn by a tractor preferably at a speed of approximately four or five miles an hour, the successive penetrations of members 67 into the ground at each side of the plant row 71 will cause an automatic turning of the ground breaking or mulching cones, and that such outer ends of the members 67 penetrating the ground in practice preferably about one-half inch will break up, stir and mulch the soil at each side of the row of plants 71 and free and loosen the ground from where the penetration occurs inwardly to the plant row. When the end of a member 67 which has penetrated through the ground such distance, moving bodily forward as the tractor pulls the weeder and rotating to the rear due to such forward movement, is automatically moved to and above the surface of the ground, the resistance of the ground will cause such members to be strained or swung rearwardly and potential energy is stored in each of such members 67 until it overcomes the ground resistance, whereupon such member 67 swings back into alignment with the rod on which secured thereby breaking up the ground at each side of the row into pieces and particles.

Immediately following thereafter will come automatic rotation of the weeding cones at the rear as shown in FIG. 8, due to the ground penetration of the rods 70 at each side of the row. The free end portions of the light strength coiled members 69, overlapping a distance at their ends and crossing the row, causes a sweeping movement of the free ends of the members 69 which successively sweep and throw away from the row the surface portions of the ground which have previously been broken up and pulverized, thereby removing in a large measure the small weeds which have germinated and which, if left in place in a row of plants, would grow sufficiently large to smother the plants.

When the ground is not level, with certain plants the ground banked up, for example, with celery, as in FIG. 9, the scrapers 57 are tilted and the mulching and weeding cones are interchanged. That is, the mulching cones with the coiled members 67 are moved to the rear while the weeding cones with the coiled members 69 are moved forward to intermediate position between said weeders and the mulching cones. The sweeping of the surface portions of the ground at a short distance to each side of the plant row 71 takes place the same as before while by reversing the position of the mounting bar 62 so that the stems 63 are outside of the planes of the bars 51 and tilting and rotating stems 63 as shown in FIG. 9, the mulching members 67 engage the ground a distance outwardly and toward the base of the mound, which extends lengthwise of the plant row, so that on rotation of the mulching cones and the successive breaking loose of the members 67 from the ground, portions of the earth are thrown inwardly toward the plant row to maintain the mound form.

The structure described and the arrangement of the weeding and mulching cones are preferred where one row is weeded with a passage of the tractor lengthwise thereof. Other drawbars 55a or 55b as in FIGS. 10 and 11, longer than the drawbar 55, may have connected therewith more than one of the bars 51. In FIG. 10, five are shown so that four plant rows 71 are simultaneously taken care of; and in FIG. 11 four of the bars 51 are arranged in two pairs to weed and simultaneously mulch two plant rows 71. The mounting of the weeding and mulching cones on the bars is susceptible of an indefinite number of arrangements so that all types of row crops which need cultivating, mulching and weeding are readily serviced by our invention.

Although we have shown and described only one em-

We claim:

1. Structure as described comprising: parallel, horizontal spaced bars, a wheel at the rear end of each bar elevating said bar to a predetermined position, means at the front ends of said bars for connection to a pulling implement, and mulching units mounted on said bars, turnable about an axis inclined to the vertical, each mulching unit having a plurality of spaced, downwardly, and outwardly, radially diverging members, the outer ends of which are adapted to successively penetrate the ground over which drawn and withdraw therefrom as the bars on which carried are drawn in a forward direction, the free ends of said members on the mulching unit on opposite bars penetrating the ground at short distances from each other, and weeding units on said bars spaced from the mulching units mounted to turn about axes forwardly and outwardly inclined in a downward direction to the vertical, each weeding unit having rotating means adapted to penetrate the ground, and spaced, radially diverging downwardly and outwardly extending flexible members adapted to successively penetrate the ground to a lesser extent than the first members of the mulching unit, the free end portions of said flexible members of opposite weeding units intermeshing and extending essentially into the plant row upon engaging the ground.

2. A cultivator comprising: a frame and means for supporting said frame, and mulching units mounted on said frame, turnable about an axis inclined to the vertical, each mulching unit having a plurality of spaced, downwardly, and outwardly radially diverging members, the outward ends of which are adapted to successively penetrate the ground over which drawn and withdraw therefrom as said frame is drawn in a forward direction the free ends of said members in the mulching units on spaced positions of said frame penetrating the ground at short distances from each other, and weeding units on said frame spaced from the mulching units mounted to turn about axes forwardly and outwardly inclined in a downward direction to the vertical, each weeding unit having rotative driving means adapted to penetrate the ground, and spaced radially diverging downwardly and outwardly extending flexible members adapted to successively penetrate the ground to a lesser extent than the first members of the mulching units, the free end portions of said flexible members on opposite weeding units intermeshing and extending essentially into the plant row upon engaging the ground.

References Cited in the file of this patent

UNITED STATES PATENTS

| | | |
|---|---|---|
| 251,784 | Lindsey | Jan. 3, 1882 |
| 1,056,473 | Turner et al. | Mar. 18, 1913 |
| 1,610,587 | Randolph et al. | Dec. 14, 1926 |
| 2,061,694 | Cuddigan | Nov. 24, 1936 |
| 2,804,813 | Ritchie | Sept. 3, 1957 |
| 2,912,055 | Buddingh et al. | Nov. 10, 1959 |

FOREIGN PATENTS

| | | |
|---|---|---|
| 8,858 | Great Britain | May 3, 1893 |
| 390,273 | Great Britain | Apr. 6, 1933 |